United States Patent [19]

Williams

[11] 4,174,663
[45] Nov. 20, 1979

[54] SAFETY SYSTEM FOR HYDRAULIC VERTICAL PRESS

[75] Inventor: Roy K. Williams, Corinth, Miss.

[73] Assignee: International Telephone and Telegraph Corporation, New York, N.Y.

[21] Appl. No.: 880,371

[22] Filed: Feb. 23, 1978

[51] Int. Cl.² .............................. F16P 7/00; B30B 1/08
[52] U.S. Cl. ................................. 100/53; 192/129 R; 425/153
[58] Field of Search ........... 192/129 R, 129 A, 129 B; 100/53, 48; 425/151, 153, DIG. 45; 267/130

[56] References Cited

U.S. PATENT DOCUMENTS

| | | | |
|---|---|---|---|
| 3,309,739 | 3/1967 | Trueblood | 425/151 |
| 3,999,477 | 12/1976 | Good | 100/53 |
| 4,011,809 | 3/1977 | Waller | 100/48 |

Primary Examiner—Billy J. Wilhite
Attorney, Agent, or Firm—James B. Raden; Marvin M. Chaban

[57] ABSTRACT

A system for preventing the free fall of the platen of a vertical molding machine in the event of failure of the connection between the drive rod and the platen. A hydraulic network is employed to enable the movement of the platen. The network employs a counterbalancing circuit to permit raising the rod and platen and for preventing the gravitational fall of the rod and platen. The operation of this hydraulic circuit is controlled by valves which transfer the hydraulic fluid between the two ends of the respective cylinders, and a storage tank (to store the difference in volume between the rod end and cap end of the respective cylinders). With fluid flowing from the cap end of cylinders to the rod end of said cylinders, the platen may descend. With fluid remaining in the cylinders, the piston and platen cannot descend without the fluid being transferred back to the other end of said cylinder by operation of an electrically controlled valving arrangement. A normally open (held closed by presence of the rod) switch is connected into the operating path of the valving network. The switch control mechanism senses the continued engagement of the rod and platen and opens on the release of this engagement to open the valve operating circuit and prevent descent of the ram and platen.

6 Claims, 3 Drawing Figures

SAFETY SYSTEM FOR HYDRAULIC VERTICAL PRESS

BACKGROUND OF THE INVENTION

In industry in general and more particularly in the press machine art, considerably greater emphasis is being laid on safety and on the prevention of injury to the machine operator. Thus, safety systems are provided which require that the operator hold switches closed during the descent of the press ram. This requirement ensures that the operator's hands are away from the area beneath ram or the ram cannot descend. An example of a mechanical block of this type is shown in U.S. Pat. No. 3,999,477 to Good.

Other patents are known showing a pressure cushion acting as a hydraulic overload safety device for counterbalancing the weight of the ram, i.e., U.S. Pat. No. 4,011,809 issued Mar. 15, 1977 to E. Waller et al issued Mar. 15, 1977.

SUMMARY OF THE INVENTION

The present invention provides a safety system for a vertical hydraulic press in which the trouble condition of separation of the movable platen from its support structure is sensed to prevent the free fall of the platen. The prevention is afforded by disabling a pilot valve in the hydraulic counterbalance system to prevent the flow of fluid from blocking cylinders. In this way, a hydraulic block is imposed in the path of movement of the platen to prevent its downward movement and resultant possible injury to a machine operator or repair person.

It is, therefore, an object of the invention to provide a mechanism which monitors the continued support of the moving platen of a hydraulic vertical press by its drive rod and only acts to prevent downward movement of the platen on the failure of that continued support.

Other objects, features and advantages of the invention will become apparent from the following detailed description viewed in conjunction with the drawings as briefly described next.

DETAILED DESCRIPTION OF THE INVENTION

Figure 1:
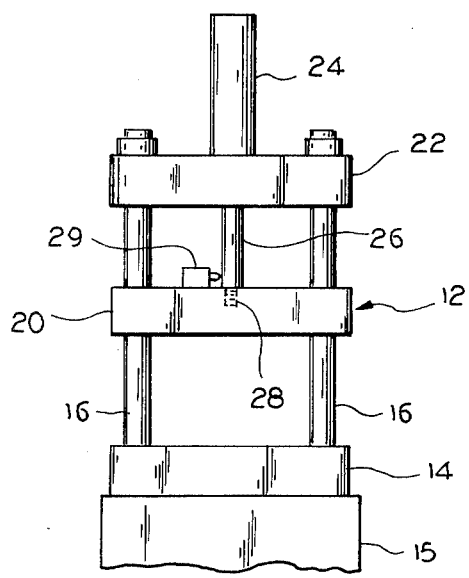
FIG. 1 is a side view in elevation of a press to which my invention may be applied.

In FIG. 1, I show a partial view of a vertical press 12 which may be a vertical molding press. The press 12 is comprised of a stationary platform or platen 14 which has at its corners support columns 16 on which a movable platen 20 is journaled for vertical reciprocal motion. The columns extend through movable platen and are affixed at their upper end in a support frame 22. A clamp cylinder 24 passes through the frame 22 and is formed with a downwardly extending rod 26 which is suitably secured to the moving platen to provide the reciprocatory motion of the moving platen. Such a press may be of the type shown in U.S. Pat. No. 3,309,739 issued on Mar. 21, 1967 to E. D. Trueblood.

In the press as shown in FIG. 1, the rod 26 has a threaded end 28 which is mated with a suitably threaded opening in the upper surface of movable platen 20. The threaded end is of reduced diameter when compared to the diameter of rod 26, there being a necked section between rod 26 and the threaded end. This necked section, as is well-known, is subject to shear stresses in the operation of the press. Thus, a limit switch or miniature switch 29 is affixed on the movable platen to be engaged by the rod 26 and maintain the switch in the closed position. In the event of shear at that section and subsequent separation of the platen from the rod, the switch 29 will cause its contacts to open.

Figure 2:
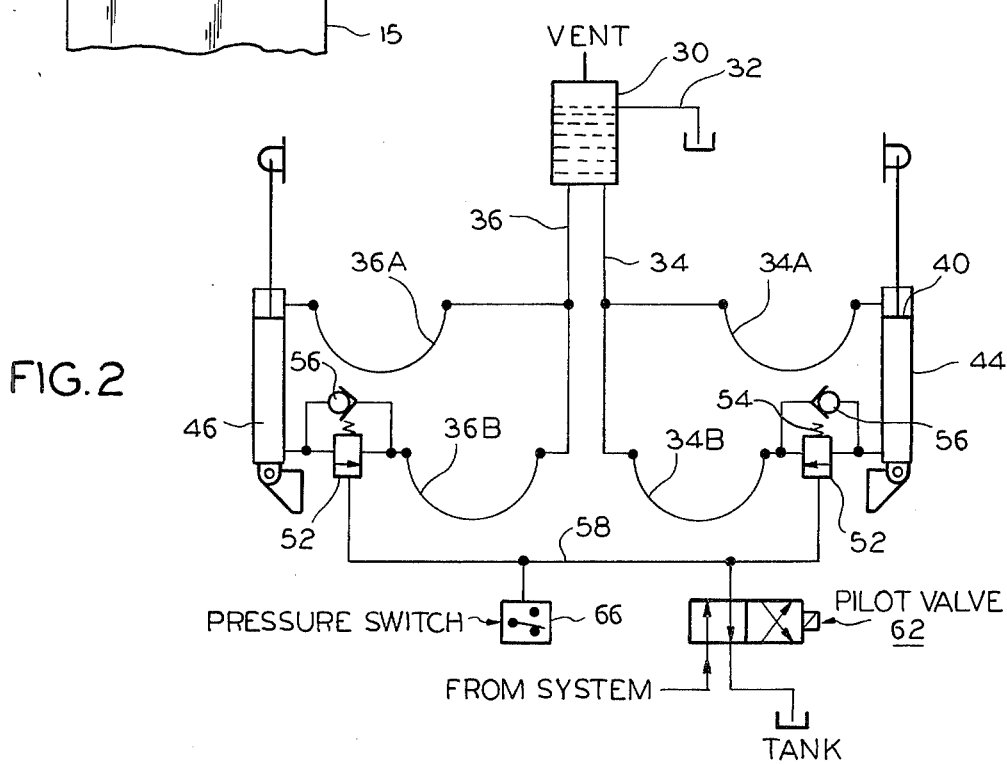
FIG. 2 is a schematic hydraulic diagram of the control system for the control system for the press of FIG. 1.

In FIG. 2, I show the hydraulic system which can be applied to the press of FIG. 1. The system of FIG. 2 includes a tank of hydraulic fluid 30, suitably vented, with overflow path 32. The tank has two feed lines extending from it, one feed line for each cylinder. Each feed line, such as 34, has two parallel paths each feeding one side of the bidirectional cylinder, such as cylinder 44 for path 34 and cylinder 46 for feed line 36. Path 34 has one path 34A directed to the cap portion of the cylinder above piston 40. The cylinder portion fed by path 34A is filled by gravity, as piston 40 moves down. Tank 30 stores oil that is displaced by the cylinder rod as piston 40 moves down. When the cylinder portion (or rod end) fed by path 34B is filled, continued presence of blocked hydraulic fluid below piston 40 will prevent the downward movement of the piston and platen under the force of gravity. In this way, a hydraulic block to the platen movement is imposed. By connecting the top of piston 40 to platen 20 and the bottom of cylinder 44 to base 14 at one side of the apparatus of FIG. 1, and connecting cylinder 46 and its piston in a like manner to the other side of the apparatus, the hydraulic system of FIG. 2 can be fitted onto the press shown in FIG. 1.

Paths 34B and 36B each have a counterbalance valve 52, both valves acting to control flow to and from the portion of cylinder below the piston. A check valve 56 (which may be a part of counterbalance valve) is positioned to prevent flow of hydraulic fluid out of the lower portion of the cylinder. The counterbalance valve 52 is operated by the pressure in the hydraulic line 58 being raised above a threshold level. The operation of pilot valve 62 directs pressure to counterbalance valves 52 and pressure switch 66. The counterbalance valves 52 are open at lower pressure than that required to close contacts in the pressure switch, thus insuring that paths 34 and 36 are open before a conventional press close solenoid is energized.

Figure 3:
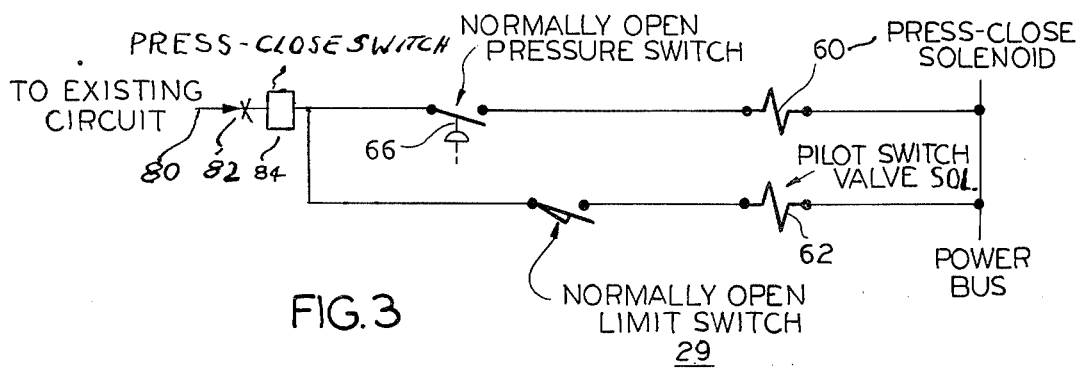
FIG. 3 is a schematic electrical circuit diagram for the press of FIG. 1.

As viewed in FIG. 3, the electrical circuit controls the system in the following manner. When a signal from the lead 80 such as that caused by the closure of press-close button 82 is received, the signal passes through the necessary safety interlocks shown as box 84. A path may be traced through the lower branch and the limit switch 29 (held closed by the rod to platen engagement) to the pilot valve solenoid 62. The pilot valve solenoid operates to close the pilot valve 62. Closure of the pilot valve (FIG. 2) closes a hydraulic path from the system source of fluid at the supply pressure which may be 500 p.s.i. As the pressure builds up in the hydraulic network of FIG. 2, the counterbalance valve will open as a result of the pressure in the system overcoming the force of spring 54. The value of pressure at which the valve 52 opens is an intermediate value of pressure which we will estimate at 250 p.s.i. With valve 52 open, the hydraulic pressure continues to build to a greater value sufficient to actuate pressure switch 66. The value at which the pressure switch closes is, as mentioned, greater than that at which valve 52 operates, and is assumed to be about 350 p.s.i. As the pressure switch closes its contacts (FIG. 3), it closes the press close solenoid 60 to enable the press to close.

By setting the operating level of the pressure switch at a higher value than the level for operation of the counterbalance valve, I ensure that the counterbalance valve is open before the press-close solenoid operates to start the downward movement of the press in the normal manner.

The counterbalance valve is unidirectional through its check valve 56 which prevents the outflow of fluid from the piston end of cylinders 44 and 46 should the pilot valve close during the movement of the piston and platen in either its up or down movement. Thus, in the event that switch 29 were to open, signalling a break in the relationship between rod 26 and platen 20, the pilot valve will close. Pressure cannot build further within the system and as the pressure drops, the pressure switch will open the path to the press-close solenoid 60. The counterbalance valve will close as the pressure drops and its check valve 56 being unidirectional will not allow the outflow of fluid from the piston end of cylinders 44 and 46. At levels below the operating level of the counterbalance valve, fluid cannot flow out of the piston end and the platen is prevented from free fall.

In the absence of closure of solenoid of pilot valve 62, the counterbalance valve will not open and will not drain fluid from beneath the piston. Operation of solenoid 60 requires that pressure switch 66 be closed. Operation of solenoid 62 requires the continued closure of the limit switch 29, and the operation of two palm switches (FIG. 3).

In the event of breakage of the rod 26 (which would most likely occur at the necked portion 28) and the resultant separation of rod 26 from the movable platen 20, the limit switch 29 will open its contacts and de-energize pilot valve 62, thus closing counterbalance valves 52 and opening pressure switch 66, de-energizing solenoid 60. In this condition, the cylinders below the piston cannot be drained and the piston 40 and the movable platen 20 carried by it cannot descend, nor can the press-close solenoid 60 be energized.

By this construction, in addition to the necessity for the conventional palm switch operation, the downward movement of the platen is allowed only as long as switch 29 senses the continued relationship of rod to platen, and movement of the platen is prevented when switch 29 senses discontinued relationship or connection of the rod to platen. This relationship is monitored to control hydraulic flow even in the partial stages of movement of the platen during both opening and closing of the press.

I claim:

1. A hydraulic control system for a vertical hydraulic press adapted for heavy duty use, in which said press includes a fixed platen and a moving platen, said moving platen being engaged by a drive member for upward movement in opening the press and for downward movement for molding processes within said press, said control system including at least one hydraulic cylinder with piston reciprocal therein, said cylinder imposed within a hydraulic network for enabling the downward movement of said piston in said cylinder and consequent downward movement of said moving platen, said cylinder being adapted to be connected to said fixed platen and the piston thereof being adapted to be connected to the moving platen, a switch mechanism for detecting the continued engagement of said moving platen to said drive member, said switch mechanism responsive to the detection of a failure of said engagement for operating said hydraulic network to a condition preventing movement of said piston in said hydraulic cylinder thereby preventing downward movement of said platen.

2. A hydraulic control system as claimed in claim 1, in which the hydraulic network comprises a counterbalancing circuit normally enabling the movement of said platen, and said switch mechanism positioned in the operating path to a valve assembly in hydraulic communication with said cylinder, said switch mechanism being held closed to maintaining said path in an operative condition, and said switch mechanism opening said path on the failure of said engagement to prevent operation of said system.

3. A safety control system for a vertical hydraulic press which includes an operating platen supported for reciprocation relative to a stationary platen by a mounting member, the invention comprising switch means monitoring the continued support of said operating platen by said member and for preventing the free downward movement of said operating platen in the event of discontinuance of said support, a cylinder adapted to be connected to the stationary platen, a piston reciprocal in said cylinder, a valve mechanism for controlling the movement of hydraulic fluid within a hydraulic network to feed fluid into and out of said cylinder to enable the reciprocatory movement of said piston, said piston adapted to be operatively connected to said operating platen for enabling the movement thereof, an operating path to said valve mechanism including said switch means in a continued support condition, and said network including safety means in said path for preventing downward movement of said piston and operating platen in the event of malfunction of said hydraulic network.

4. A safety control system as claimed in claim 3, in which said safety means includes a first pressure sensitive mechanism for monitoring pressure in said network to enable the operation of said press and platen on pressure in said network above a first level, and a further pressure sensitive mechanism for draining fluid from said cylinder to allow downward movement of said operating platen in response to continued pressure above a second level in said network, wherein pressure in said network cannot rise above said levels without continued operation of said valve mechanism.

5. A safety control system as claimed in claim 4, in which said first mechanism comprises a pressure switch responsive to pressure above said first level for closing an operating path for said operating platen, and said second mechanism comprises a counterbalance valve for controlling flow to and from said cylinder.

6. A system as claimed in claim 4, in which said first level is higher than said second level to prevent flow of fluid from said cylinder and prevent downward movement of said operating platen responsive to loss of pressure in said network.

* * * * *